US006778096B1

(12) United States Patent
Ward et al.

(10) Patent No.: US 6,778,096 B1
(45) Date of Patent: Aug. 17, 2004

(54) METHOD AND APPARATUS FOR DEPLOYING AND TRACKING COMPUTERS

(75) Inventors: James Peter Ward, Raleigh, NC (US); Kerry Maletsky, Monument, CO (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 08/971,386

(22) Filed: Nov. 17, 1997

(51) Int. Cl.[7] .............................................. H04Q 1/00
(52) U.S. Cl. ............................. 340/825.51; 409/200.2
(58) Field of Search ..................... 340/825.54, 825.69, 340/505, 572.1, 572, 825, 825.34, 568, 10.51, 10.52; 342/51, 44; 367/2; 235/492, 382, 375, 1; 713/1, 2; 709/200.2, 200.21, 200.22

(56) References Cited

U.S. PATENT DOCUMENTS

| | | | | |
|---|---|---|---|---|
| 4,656,463 A | * | 4/1987 | Anders et al. | 340/573.4 |
| 5,151,684 A | * | 9/1992 | Johnsen | 340/568.1 |
| 5,287,455 A | * | 2/1994 | Rosenthal | 709/200.2 |
| 5,302,947 A | * | 4/1994 | Fuller | 340/825.44 |
| 5,339,074 A | * | 8/1994 | Shindley et al. | 340/825.34 X |
| 5,444,643 A | * | 8/1995 | Haussler | 709/200.2 |
| 5,510,775 A | * | 4/1996 | Loncle | 709/200.2 |
| 5,517,194 A | * | 5/1996 | Carroll et al. | 340/825.54 X |
| 5,666,501 A | | 9/1997 | Jones et al. | 345/348 |
| 5,850,187 A | * | 12/1998 | Carrendar et al. | 340/825.54 |
| 5,887,176 A | * | 3/1999 | Griffith et al. | 340/825.54 X |

* cited by examiner

*Primary Examiner*—Brian Zimmerman
(74) *Attorney, Agent, or Firm*—Bracewell & Patterson L.L.P.

(57) ABSTRACT

A method of asset control and workstation computer deployment that utilizes a dual port electronic memory identification RFID tag to hold serial number and hardware and software configuration profiles as well as user information. The RFID tag is mapped into the workstation computer memory space and can also be read and written by wireless radio frequency signalling. Serial numbers and MAC address is stored on the tag by the manufacturer. User information, workstation profile and software image information is stored onto the tag while the computer is being received for forwarding to the final workstation destination without the need to unpack and power up the computer. The information stored on the tag is used to allow automated system configuration and software downloading to the computer.

2 Claims, 3 Drawing Sheets

METHOD AND APPARATUS FOR DEPLOYING AND TRACKING COMPUTERS

BACKGROUND OF THE INVENTION

1. Field of the Invention

This invention relates to tailoring the configuration and programs of general purpose computers and other electronic devices for special applications and to tracking these computers and electronic devices as an asset through its useful life.

2. Description of the Prior Art

It is known in the art to construct general purpose hardware computers and then tailor them for special applications by loading an operating system and other control programs into each computer that tailors each computer for an application such as text processing, graphic arts, scientific calculation, financial accounting, teller work station, bank officer work station, point of sale, process control, internet or other database access communication as well as other applications too numerous to mention.

In addition, each computer must be configured with characteristics unique to the operator or workstation to which the computer will be assigned. Examples are the users name, network configuration parameters, and the identity of the programs that will be needed in the workstation of each computer. In each case, the computer must be powered up and the configuration choices entered by the keyboard or by a removable media prepared in advance, and programs must be loaded into the computer from removable media such as a diskette or a CDROM or from a communication line. U.S. Pat. No. 5,666,501 shows an example of the steps that need to be accomplished in the prior art to configure a workstation.

Often this configuration is left for the user to accomplish when the computer is unpacked. The user is then faced with the task of configuring the computer operating system and installing the programs. This can be an inconvenient and daunting task for a person who is not familiar with the specific computer and who has little experience in deciphering program installation instructions. Invariably the user fails to follow the instructions in some particular and requires assistance from a telephone support center or calls for repair after assuming that the new computer has a fault or the programs have a bug.

If experienced personnel are employed for this task, significant cost and time is expended as they travel from workstation to workstation configuring each computer and installing the appropriate programs. This scenario is costly in support personnel time and customer satisfaction suffers.

In addition, when the customer is a company or other organization, there is the need to record the computer as a capital asset and to track the location of the computer throughout its useful life. Labels, tags and the computer serial number have been used for this purpose. Labels and tags may be removed and internally stored serial numbers again require the computer to be powered up for inventory data gathering.

SUMMARY OF THE INVENTION

These problems of user inconvenience, delay in installation, cost and customer dissatisfaction are reduced substantially by this invention which has the advantage that information needed to configure a computer for implementing a workstation is loaded onto the memory of a fully packaged general purpose computer or other electronic device as it is being received at a receiving dock from a warehouse or queue after final test without unpacking and applying power to the device.

It is a further advantage of the invention that information needed to restore the workstation computer for implementing the workstation was stored onto the RFID tag memory it was being received at a receiving dock continues to be available for identifying the software image profile and can be accessed by a LAN server to restore or to update software that has been compromised at the workstation without the need to manually reload the programs.

It is a still further advantage of the invention that the customer can gather inventory data directly from the memory of the computer without having to turn the computer on and enter a password to access computer memory.

These and other advantages are obtained by this invention which stores serial number, program image profile and user information in a dual ported electronic non-volatile memory identification tag that has a wireless memory interface for radio frequency access without the need for AC power and a standard parallel or serial interface to the computer's bus for normal access while the computer is running under power. The dual ported non-volatile identification tag wireless radio frequency (RF) interface derives its own power from an RF signal that transmits digital program profile and configuration information to the identification tag as the computer is in transit in it's shipping carton on a conveyor for example.

DESCRIPTION OF A PREFERRED EMBODIMENT

Figure 1:
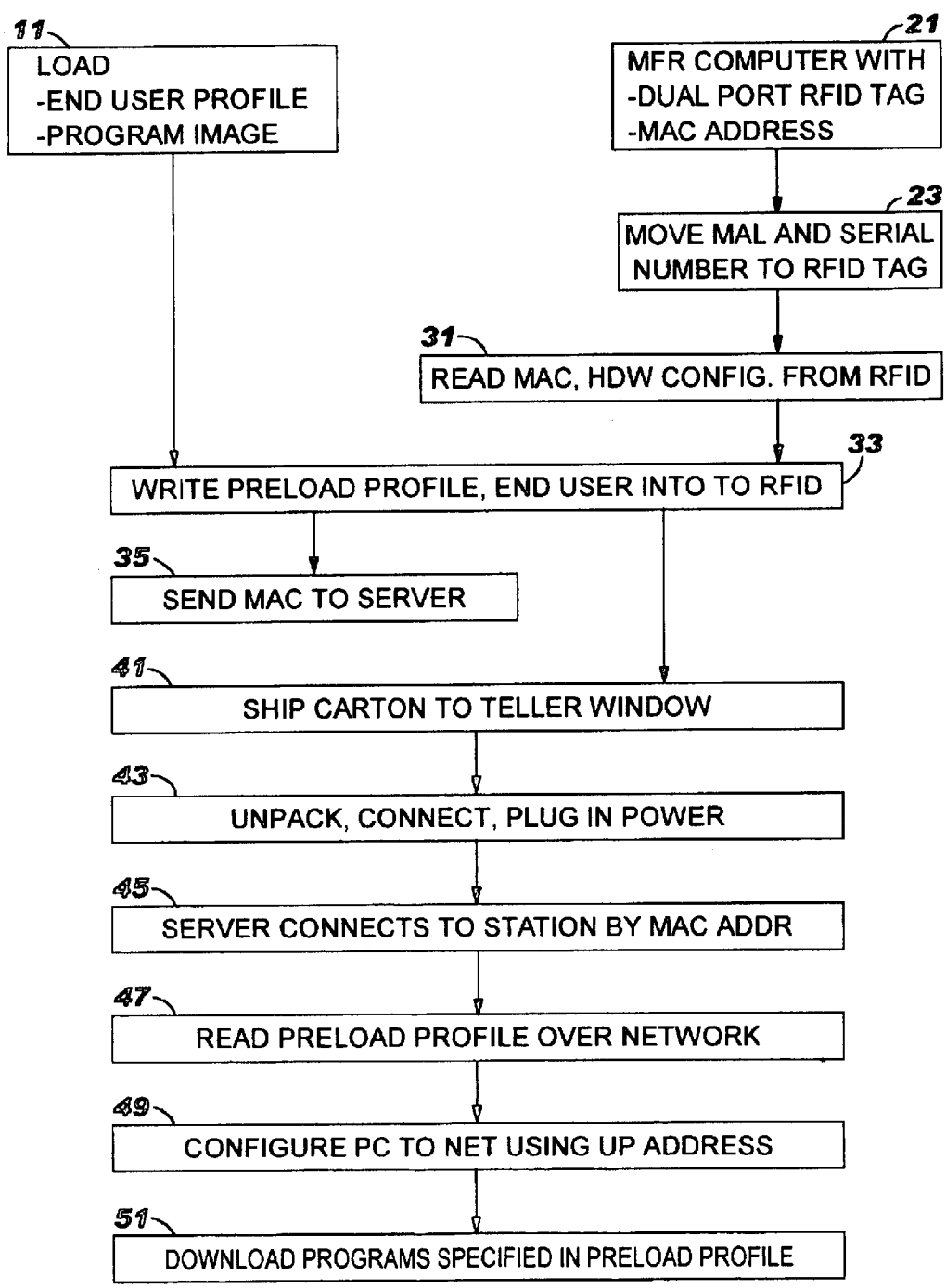
FIG. 1 shows a flow diagram of the method of the invention.

The flow diagram of the method of the invention is shown in FIG. 1 and the flow starts at two places. The customer company that is deploying the new computers at diverse workstations, loads the end user profile and the control and application program image profile into a server or host computer at block 11. The end user profile is shown by way of example in table I below and the control and application program image profile is shown by way of a teller work station example in table II below.

The second starting point for the flow occurs at the manufacturer of the computer that will be used to implement the users workstation which in this example is a teller workstation. At block 21 the computer manufacturer assembles the computer and installs a dual port radio frequency identification (RFID) tag as a small part of the computers memory space. At block 23, an initialization program reads the unique IEEE assigned media access control (MAC) address which the manufacturer has placed in the computer communication hardware and stores it in the RF ID tag memory using the serial interface port. Also at block 23, the initialization program determines the devices which constitute the workstation hardware such as X meg of memory, Y baude modem, Z meg hard media drive and others. These devices are assigned resources of the computer including address space and I/O ports by the hardware configuration routines of the initialization program. The hardware configuration including device and the computer serial numbers are then recorded in the RFID tag for later access during deployment of the computer to a workstation.

At block 31, deployment begins as the computer arrives at the customer company receiving dock an is assigned to a particular workspace such as a teller workstation number 3 at branch location A. At block 31 the RFID tag is read using an RF tag interrogator which can read and write to the RFID tag while the computer is still in the shipping carton and without the need to power up the computer. Specifically, the MAC address and the hardware configuration data is read from the RFID tag.

During this same RF access to the RFID tag, a copy of the end user profile and the program image profile entered at block 11 is now written at block 33 to the RFID tag by the RFID tag interrogator.

Moving on to block 35, the MAC address and the hardware configuration data including serial numbers read from the RFID tag is sent back the server or host computer and then at block 41 the computer is forwarded to the teller workstation in branch A for example, without having been unpacked.

When the computer arrives at the branch A, it is unpacked, connected to the LAN, printers etc. and plugged in to AC power as shown at block 43. At block 45, the workstation computer is either powered up by the installer or user or the server polls the computer by MAC address and wakes up the computer for configuration and preloading.

At block 47 the computer reads the information stored in the RFID tag on the receiving dock and sends this information to the server or host. At block 49 the server responds by sending software configuration data to the workstation using the IPADDRESS just received. Then at block 51, the necessary programs including for example operating system routines, device drivers, application programs and user data are send to the workstation computer and installed on the computer being deployed.

Figure 2:
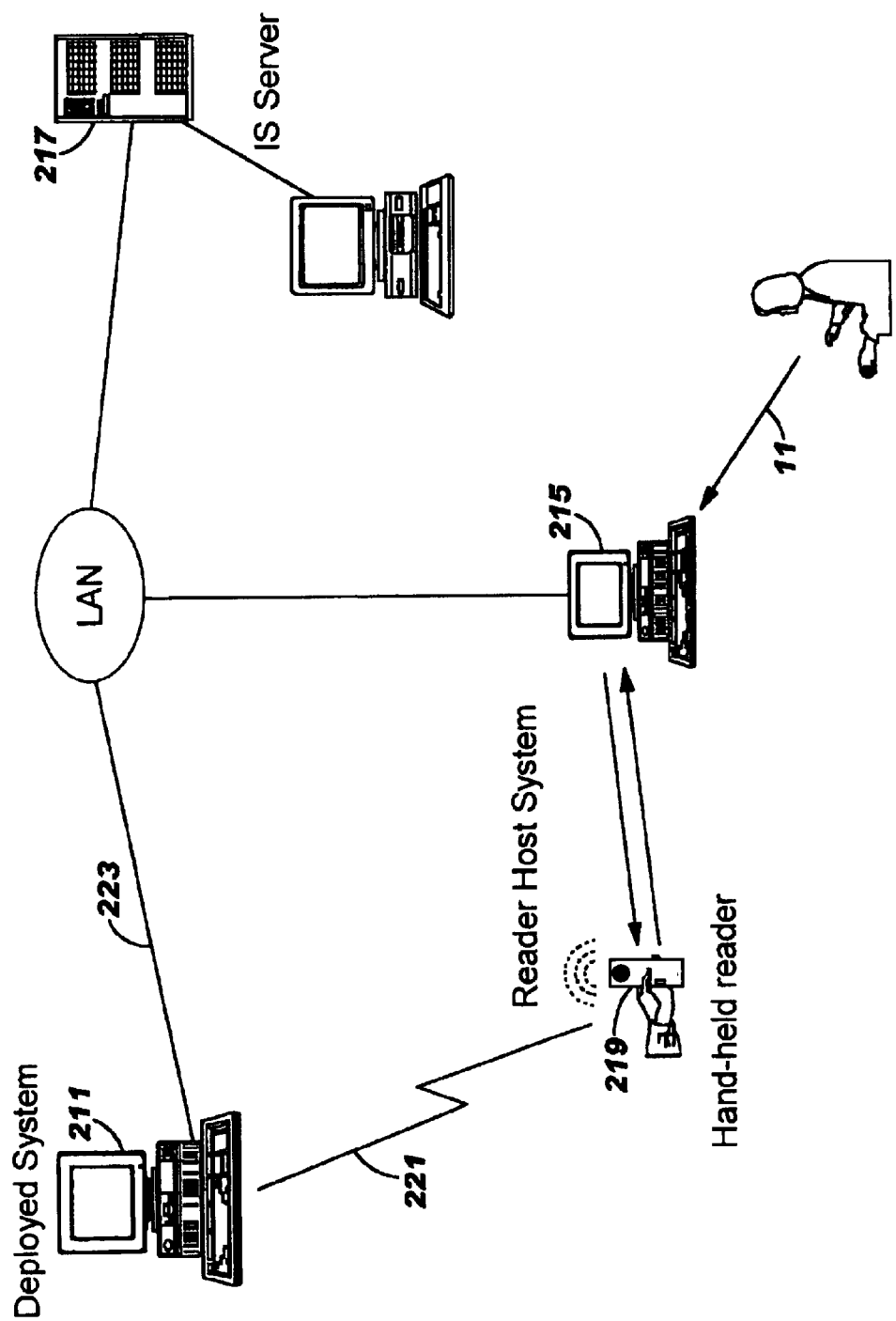
FIG. 2 shows a block diagram of the system of the invention for configuring a computer having a dual ported memory.

FIG. 2 shows a system diagram of a workstation system 211 at various steps in its deployment. In preparation for receiving the computer 211, the end users information is entered at a computer 215 and this information is sent to a host server 217 and to a hand held RF interrogator 219. When the system 211 is first received, the interrogator 219 reads MAC address and configuration information from a dual port electronic non-volatile memory identification tag (RFID tag) that has a wireless memory interface for radio frequency access without the need for AC power and a standard parallel or serial interface to the computer's bus for normal access while the computer is running under power. The computer is still in its shipping carton and RF link 221 is used. At this same time user information in the form of IP address, software preload profile and other information is written to the RFID tag while the computer is still in the box. The computer 211 is then shipped forward to the workstation location, unpacked and connected to the LAN by link 223.

The server 217 can then read the preload profile and other user information from the RFID tag using its serial memory bus (SMBus) port. Using this information the server 217 then sends software network configuration files and downloads application and other programs specified in the preload profile.

Figure 3:
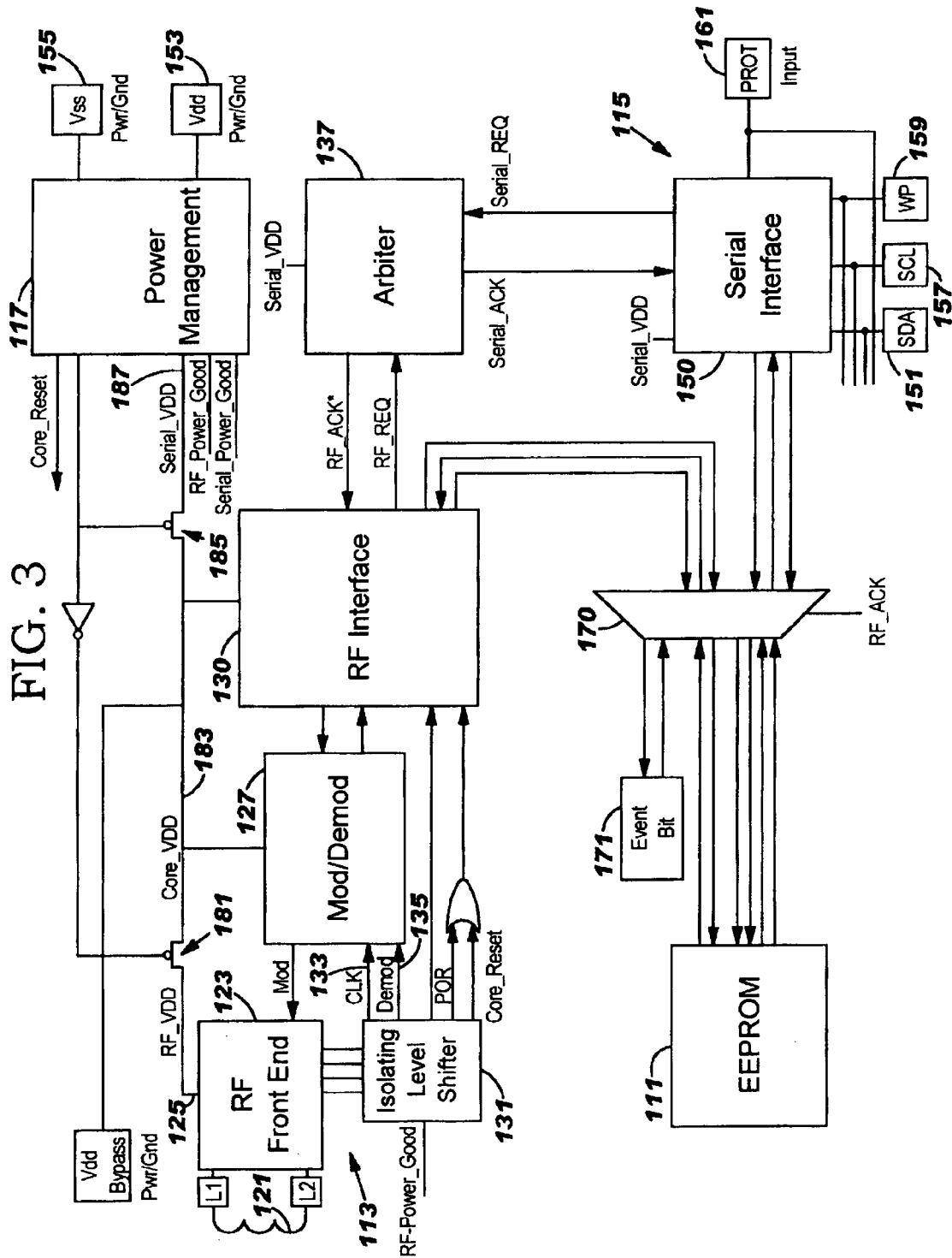
FIG. 3 is a block diagram of a dual port identification tag utilized by this invention.

Referring now to FIG. 3, the heart of the tag used in this invention is an electrically erasable programmable read only memory (EEPROM) 111. The tag has two communication ports in the form of an RF port shown at 113, and a serial port shown at 115. It will be recognized that a parallel port could be substituted for the serial port or both could be provided along with the RF port. Power to operate the memory 111 and the communication ports 113 and 115 is controlled by power management circuits 117.

The RF port 113 comprises an antenna coil 121 connected to RF front end circuits 123. RF front end 123 comprises a rectifier for converting a portion of the RF energy into DC power which is provided on line 125. After power has been accumulated from the RF signals, is amplified and provided to the mod/demod circuits 127 for conversion into digital signals which can be detected and acted upon and/or stored into memory 111 by the logic in RF interface 130. Level shifter 131 provides the first steps in converting the RF signal to a digital signal by isolating the clock from the data and providing each on lines 133 and 135 respectively.

The serial port 115 is relatively simpler since the serial interface 150 can receive digital signals at input 151 without the need for conversion. DC power for operating the tag in the serial port mode is provided at connection 153 and ground is provided at 155 to power management 117. A serial clock signal is connected to input 157 and a write protect signal is connected to input 159. The write protect input protects the memory on a full chip basis. The input 161 is an access protect input that is used to protect memory on a page and block basis. Protect input 161 is connected to power on reset in the electronic device or computer and when this input pin is low, the serial port is held in reset and all sticky bits are set to one. When high, activity on the serial bus is permitted. This has the effect of resetting lock bits on access control bits so that only the set up process during power up is able to modify access and changes to security levels for memory pages or blocks can not be made from the RF port 113 or the serial port 115 after the system has been brought up.

An arbiter circuit 137 receives a serial request signal from the serial interface when the electronic device to which the tag is attached wishes to communicate with the tag. If the RF interface 130 is not communicating, the arbiter circuit 137 sends an ACK signal to the serial interface 150. In like manner, the arbiter circuit 137 receives an RF request signal from the RF interface when an interrogator wishes to communicate with the tag. If the serial interface 150 is not communicating, the arbiter circuit 137 sends an ACK signal to the RF interface 130.

Each of interfaces 130 and 150 is also connected to a gate 170 which is in turn connected to the memory 111 to allow one or the other interface to be connected to the memory 11 for reading or writing information.

Power to operate the memory 111 and the communication ports is controlled by power management circuits 117. When communicating with an interrogator, the power transistor 181 controlled by circuits 117 switches power from the line 125 to line 183 to power the memory 111, the mod/demod 127, the RF interface 130, arbiter 137 as well as the power management itself and the gate 170. When communicating with the electronic device to which the tag is attached, the power transistor 183 controlled by circuits 117 switches DC power received at power input 153 from the line 187 to line 183 to power the memory 111, the mod/demod 127, the RF interface 130, the serial interface 150, arbiter 137 as well as the power management itself and the gate 170.

The EEPROM memory 111 is broken up into 8 blocks of 1K bits (128 bytes) each. Within each block, the memory is physically organized into 8 pages of 128 bits (16 bytes) each.

In some instances, accesses take place on a 32 bit (4 byte) word basis. In addition to these 8K bits, there are two more 128 bit pages that are used to store the access protection and ID information. There are a total of 8452 bits of EEPROM memory on the chip.

The content of the RFID tag continues to hold the profiles and the serial number information which remains available for access via the RF port of the RFID chip to persons taking inventory.

They are stored in an enhanced asset information area (EAIA) that resides in the RFID EEPROM which can be accessed either through an RF link or through the system's serial memory bus. The type of access allowed (i.e. read or write) is determined by the system BIOS. Referring to Table I, the EAIA is partitioned into 8 blocks of 128 bytes each. The first six blocks, 0–5, are reserved for RFID data, which includes system and sub system serialization data, system configuration data, and other system data that may be user specified. The six blocks are grouped into three areas of two blocks each and are referred to as the Serialization Information Area (blocks 0, 1), User Information Area (blocks 2, 3), and Configuration Information Area (blocks 4, 5), respectively.[1] The types of access allowed for both the RF and system links are also given in Table I.

TABLE I

Enhanced Asset Information Area

| Address (hex) | | | | | System |
|---|---|---|---|---|---|
| Device | Word | Block | Description | RF Access | Access |
| A8 | 00–7F | 0 | Serialization Information Area | Read only | Read/write |
|    | 80–FF | 1 | Serialization Information Area | Read only | Read/write |
| AA | 00–7F | 2 | User Information Area | Read/write | Read/write |
|    | 80–FF | 3 | User Information Area | Read/Write | Read/Write |
| AC | 00–7F | 4 | Configuration Information Area | Read only | Read/write |
|    | 80–FF | 5 | Configuration Information Area | Read only | Read/write |
| AE | 00–7F | 6 | Reserved | Locked | Locked |
|    | 80–FF | 7 | Reserved | Locked | Locked |

[1]For more information on the PCID EEPROM refer to the PCID Functional Specification.

Data can be written (and read) through either the RF interface to the system or the SMBus. Writing and reading via the RF interface will be require a portable hand held reader or door reader (collectively referred to as a reader). Software residing in the hand held reader and portal gate controller will be required to support the RF interface. Access to the EAI area data from the system side will be provided by the DMI browser provided with the AssetCare software.

When data is written to the EIA through the serial memory bus (SMBus) it is done either dynamically or statically and depends on the data. Dynamic update of some of the data is done either by the system BIOS or by the AssetCare software each time it is loaded by obtaining the information directly from the device or operating system. Other types of information must be entered and updated by a system administrator or other authorized person.

All data entered into the Enhanced Asset Information area must be associated with one of the device types defined in Table II. Although every device entered must use one of the device types defined, the inclusion of a specific entity in the EAI area is optional; however to get maximum utility from the EAI hardware, the data should be as complete and accurate as possible. The "Update" column in the table II indicates whether the device type can be dynamically updated as described in the previous section.[2] Device types for device numbers not specified in the table II are reserved for future use.

TABLE II

Device Types

| Device Type | Number | Device Type | Dynamic Update | Comment |
|---|---|---|---|---|
| 00 | 0–7 | Null | N | Device not included in PCID EEPROM |
| 01, 02 | 0–7 | Reserved | N | |
| 03 | 0–7 | Other IDE Devices | N | Includes IDE devices that do not support electronic serial number retrieval, including CDROMs. This device type is used for serialization data only. |
| 04 | 0 | System | N | |
| 05 | 0 | Riser Card | N | |
| 06 | 0–7 | Floppy | N | |
| 07 | 0 | Power Supply | N | |
| 08 | 0 | Base Planar | N | Includes devices down on the planar |
| 09 | 0 | Smart Card Reader | N | |
| 0A | 0 | Cache Card | N | |
| 0B | 0–7 | Reserved | Y | |
| 0C | 0–7 | PCI Devices | N | |
| 0D | 0–7 | ISA PnP Devices | N | |
| 0E | 0 | Monitor | Y | |
| 0F | 0–7 | IDE Devices | Y | Used by serialization for all IDE devices with electronic serial number. Used by configuration for all IDE devices. |
| 10 | 0–7 | CPU | Y | |
| 11 | 0–7 | DIMM | Y | DIMM with electronic serial number |
| 12 | 0–7 | Network Interface | Y | |
| 13 | 0–7 | SCSI Devices | | |
| 14–1E | 0–7 | Reserved | | Reserved for future use |
| 1F | 2 | Network Connection | N | |
|    | 3 | User device | N | User defined device type |
|    | 4 | Preload Profile | N | User specified Preload |
|    | 5 | User asset data | N | User specified asset information |
|    | 6 | Lease data | N | User specified lease information |
|    | 7 | Owner data | N | User specified information |

[2]Dynamically updated information should not be written to the EAI area during manufacturing initialization.

0.1 Checksum Fields

Each area contains two checksums: one is used to validate the data in the header and the other is used to validate the data. All checksums are computed using the following algorithm: summing all data locations used and the checksum location should result in all zeroes in the eight low order bit positions or in other words $$(\Sigma data + checksum) \bmod 256 = 0.$$

In the equation, checksum represents the value located in the checksum field and data represents the values stored at all of the data locations to be checked. The data locations to be checked and the checksum locations differ for the three information areas. Details are given in the corresponding sections.

0.2 Device Data Structures

As described previously, all data entered in the Serialization and User areas is associated with one of the device types defined and is stored in a data structure. In practice, each instance of a device type in the system will include a corresponding data structure although inclusion of a data structure for an entity in the EAI area is optional.

The data structure for each device consists of formatted fields, and possibly unformatted fields. The formatted fields have a predefined lenght and format. The unformatted fields have a predefined meaning but have a variable length. If a data structure is included in the memory, all fields of the structure must have an entry. Each device type has different fields defined. The unformatted fields are not present in all structures.

0.2.1 Formatted Data Fields

The structure for each device type starts with a Device field and Size field. The Device field contains the device type and a device number as described in Section 3.4. The Size field is the size of the data structure including the formatted fields and unformatted fields. The structure for each device type is described in detail in Sections 5.3.2 to 5.3.7 and Section 4.3.

Due to the variable size of each structure it is not possible to locate a particular structure directly. The Size field of each structure facilitates accessing a data structure by allowing the programmer to determaine the location of the next data structure in the memory. The first structure always is located at address 10h (immediately following the header) so a search may be done for a particular device type starting at the first device and using the size field to search through the memory area.

0.2.2 Unformatted Data Fields

Many device types have unformatted fields. The data for these fields consists of a null terminated string. The string for each field must be included in the table III, even if the string is an empty string. An empty string consists of only the null terminator.

0.2.3 Data Types

All data stored in the structures is defined in terms of the basic types: BYTE, WORD, DWORD, DATE, and STRING. The DATE type is defined as 4 BYTES that allocates 4 bits for each digit of the date in the format ddmmyyyy. It is stored starting with the dd byte in low memory. A STRING consists of a series of any printable characters terminated by the null character. All data defined as a WORD or DWORD is stored in the EEPROM in little endian form, that is, the low order byte is stored in the lower memory location. All STRING data is stored in memory character by character starting with the left most character in the string and ending with the null terminator character. Data defined as two or more BYTEs is stored with the least significant BYTE stored in the lowest memory location.

0.2.4 Cross Referencing Devices

It is necessary to cross reference the data for an instance of a particular device in the configuration area to a serial number in the serialization area. In the case where there is only one instance of a particular device, the device type contained in the Device field of each structure can be used to tie the configuration data to a serial number. However, in the case where there are two or more instances of a divice, for example 2 DIMMs, another method must be used.

Data for the serialization area uses the device number bits in the Device field (refer to Section 3.4), assigning a different number to each instance of a particular device type. Where a device is associated with a particular system number designation, such as DIMM socket numbers, the device number will correspond to the system designation For example, two DIMMs, one located in DIMM socket 0 and one in socket 2 would use device numbers 0 and 2, respectively.

Data for the configuration area does not use the device number. Instead, data for a particular device is repeated in the structure for multiple instances. To maintain a correlation between the devices in the configuration area and the serialization area, a device number is implied in the configuration data structure by the order that the data is entered in the structure. An unused instance must be entered in the table but is indicated as such. For example, using the DIMM example above, the DIMM in socket 0 would be entered in the structure first, followed by an entry indicating an unpopulated DIMM socket for socket 1, followed by the entry for the DIMM in socket 2.1

1 SERIALIZATION INFORMATION AREA

Blocks 0 and 1 are reserved for system and sub system serialization information. The data within this area consists of a 16 byte header followed by the serial numbers. The data in this area is dynamically updated for the device types indicated in Table II. The layout of the Serialization Information Area is shown in Table. An example data map of the serialization area is given in Section 6 on page 29.

TABLE III

Serialization Information Area

| Offset (Hex) | |
|---|---|
| 00 | Asset Information Area Header |
| 10 | Serial Number 1 |
| | Serial Number 2 |
| | . |
| | Serial Number n |

1.1 Header

The layout for the Serialization Information Area header is shown in Table. The offset in the table is the offset from the start of the area. The first four bytes in the header are used as an identifier for the serialization area. The Length field indicates the total number of bytes in a data structure and the MaxFields field indicates the number of serial numbers in the table.

TABLE IV

Serialization Information Area Header

| Offset (Hex) | Contents | Description |
|---|---|---|
| 00–03 | SER# | Plug and Play Field Identifier = SER# for serialization area |
| 04 | Length | Number of bytes in each entity field. |
| 05 | maxFields | Number of entities used |
| 06 | versionID | Serialization Information Area version identifier (Niagara = 02h) |
| 07 | HdrChecksum | Checksum for the first 7 bytes of the header |
| 08 | AreaChecksum | Checksum for the entire serialization data |

TABLE IV-continued

Serialization Information Area Header

| Offset (Hex) | Contents | Description |
|---|---|---|
| | | including the header. |
| 09–0F | reserved | Reserved for future use. |

1.2 Checksums

The two checksums for the serialization area are included in the area header. The checksum for the header is used to check the data contained in the first 7 bytes (0–6) of the header. The checksum for the area is used to check the data located in all of the serialization area locations.

1.3 Serial Number Definition

The serial number data structure is a fixed length and consists of a Device byte followed by the serial number as shown in Table. The length of the data structure is determined by the Length field in the area header. The maximum length for a serial number is one less than the structure length. Serial numbers are comprised of ASCII characters 32 to 127 and are left justified. If a serial number is less than the number of characters allocated in the structure, the end of the serial number is padded null characters.

TABLE V

Serial Number Fields

| Offset (Hex) | Description |
|---|---|
| 00 | Device-See Section 3.4. |
| 01 | Special Character 1 of the Serial Number See Section 3.5 |
| 02 | Character 2 of the Serial Number |
| . | |
| n | Character n of the Serial Number |

1.4 Device Field

The Device field consists of two parts. The 5 high order bits of this field designate a device type as defined in Table II and indicate the attributes of the physical entity represented by the data structure. The three low order bits are the device number that designates an instance of the device type and are used for the serial number data structures. For example, a system with two hard disk drives will include two serial numbers with the same device type but two device numbers.

1.5 Character 1 Field

The character 1 field has special meaning: the first character of the serial number is represented by the 7 least significant bits of the field. The value of the most significant bit in this field is used to indicate a serial number format type as follows:
0 IBM 11S Format: an 11S prefix is implied but not included in the table.
1 Non 11 S Format: no implied prefix

2 USER INFORMATION AREA

Blocks 2 and 3 are reserved for user information. This area consists of a 16 byte area header and a 232 byte data area and an 8 byte reserved area. The User Information Area is shown in the Table. An example of a data map for the User Information Area is shown in Section 6 on page 28. This area is initialized to all 0 values during manufacturing.

TABLE VI

User Information Area

| Offset | Description |
|---|---|
| 00 | User Information Area header |
| 10 | First device structure |
| | Second device structure |
| | . |
| | Last device structure |
| | . |
| FB–FF | Reserved Area. Should not be written. |

2.1 Header

The layout for the User Information Area header is shown in Table. The offset in the table is the byte offset from the start of the user area. The Length field includes the total number of bytes currently used in the user area and can be used to locate the first free byte in the area.

TABLE VI

User Information Area Header

| Offset (Hex) | Contents | |
|---|---|---|
| 00–03 | USR# | Plug and Play Field Identifier = USR# |
| 04 | Length | Number of bytes used in User Information Area including header |
| 05 | Reserved | Reserved for future use. Must read 0. |
| 06 | versionID | Asset Information Area version identifier (Niagara = 01) |
| 07 | HdrChecksum | Checksum for the first 7 bytes of the header |
| 08 | AreaChecksum | Checksum for the entire user data area |
| 09–0F | reserved | Reserved for future use |

2.2 Checksums

Checksum fields for the user area are included in the area header. As is the case for the serialization area, the header checksum includes the data located in the first 7 bytes of the header. The area checksum covers all data in the user area. This includes the header and 232 data locations. It does not include the 8 bytes reserved at the upper end (F8–FF) of the area.

2.3 User Information

Device type 1F has been assigned to devices that have been defined for user specified information. Each user device defined is assigned one of the device numbers associated with the 1F device type. As is the case for the other areas, there is a data structure defined for each device. However, unlike the devices in the other areas, the user devices are not necessarily associated with a physical entity within the system. The data structure includes a formatted and unformatted section as described in Section 2.3. The data structures for the user area device types are given in the following sections.

2.3.1 System Owner Data

Table shows the data structure for the User Data device type. This data includes information about the user/owner of the system and is assigned the device number 7.

TABLE VIII

System Owner Data Structure

| Offset (hex) | Field Name | Field Length | Value (hex) | Description |
|---|---|---|---|---|
| 00 | Device | BYTE | FF | Device type and number as defined in Section 3.4 |
| 01 | Size | BYTE | | Size of this structure. See Section 2.3 text. |
| 02 | Name | BYTE | | String descriptor for user name |
| | Department | BYTE | | String descriptor for department information |
| | Location | BYTE | | String descriptor for location of asset |
| | Phone number | BYTE | | String descriptor for phone number |
| | Position | BYTE | | String descriptor for user's position |

2.3.2 Lease Data

Table shows the data structure for the Lease data device type, 1E. This data includes specific leasing information about the system. The device uses device number 6.

TABLE IX

Lease Data Structure

| Offset (hex) | Field Name | Field Length | Value (hex) | Description |
|---|---|---|---|---|
| 00 | Device | BYTE | FE | Device type and number as defined in Section 3.4 |
| 01 | Structure size | BYTE | | Size of this structure. See Section 2.3 text. |
| 02 | Lease Start Date | DATE | | date format: mmddyyyy |
| 06 | Lease End Data | DATE | | date format: mmddyyyy |
| 0A | Lease Term | BYTE | | Leasing term as follows: 00 Unknown 01 Month 02 Quarter 03 Semi-annual 04 Annual |
| 0B | Lease Amount | STRING | | String for the amount of the lease |
| | Lessor | STRING | | String for the lessor |

2.3.3 User Asset Data

Table shows the data structure for the User Asset, device number 5, and includes information about the asset that may be specified by the system owner.

TABLE X

User Asset Data Structure

| Offset (hex) | Field Name | Field Length | Value (hex) | Description |
|---|---|---|---|---|
| 00 | Device | BYTE | FD | Device type and number as defined in Section 3.4 |
| 01 | Structure size | BYTE | 0B | Size of this structure. See Section 2.3 text. |
| 02 | Purchase Data | DATE | | date format: mmddyyyy |
| 06 | Last Inventoried | DATE | | date format: mmddyyyy |
| 0A | Warranty end | DATE | | End date of warranty in mmddyyyy format |
| 0E | Warranty duration | BYTE | | Duration of warranty in months |
| 0F | Amount | STRING | | Amount of the warranty |
| | Asset Number | BYTE | | String with asset tag information |

2.3.4 Image Profile

Table shows the data structure for the image profile device number 4. The purpose of this device type is to allow the system administrator to tag the system for a predefined image to be downloaded to the system's hard drive. This can be done by associating the image description with a specific OS, device drivers, application software, etc.

TABLE XI

Image Profile Data Structure

| Offset (hex) | Field Name | Field Length | Value (hex) | Description |
|---|---|---|---|---|
| 00 | Device | BYTE | FC | Device type and number as defined in Section 3.4 |
| 01 | Structure size | BYTE | | Size of this structure. See Section 2.3 text. |
| 02 | ImageDate | DATE | | Date the image was loaded in mmddyyyy format. All 0s indicates no image has been loaded. |
| 06 | Image | STRING | | Null terminated string describing the image characteristics for this system. |

2.3.5 User Device

The data structure for the User Device, device number 3, shown in Table start with the Device and Size as previously defined, followed by up to 5 entries. The system owner defines what these entries represent and each entry requires two parts: a label, which describes what the entry represents and a value. The label and value are stored as null terminated strings.

TABLE XII

User Device Data Structure

| Offset (hex) | Field Name | Field Length | Value (hex) | Description |
|---|---|---|---|---|
| 00 | Device | BYTE | FB | Device type and number as defined in Section 3.4 |
| 01 | Structure size | BYTE | | Size of this structure. See Section 2.3 text. |
| 02 | Entry 1 Label | STRING | | String containing label for entry 1 |
| | Entry 1 Data | STRING | | String containing the value for entry 1 |
| | Entry 5 Label | STRING | | String containing label for entry 5 |
| | Entry 5 Data | STRING | | String containing the value for entry 5 |

2.3.6 Network Connection Data

Table shows the data structure for the Network Connection data device type. This data includes information about the system's network configuration setup and is assigned the device number 2. This structure supports only IP version 4. When a new version, which is incompatible with this structure, becomes standard a new structure will be defined.

TABLE XIII

Network Connection Data Structure

| Offset (hex) | Field Name | Field Length | Value (hex) | Description |
|---|---|---|---|---|
| 00 | Device | BYTE | FA | Device type and number as defined in Section 3.4 |
| 01 | Size | BYTE | | Size of this structure. See Section 2.3 text. |
| 07 | IP Address | 4 BYTE | | Network IP address |
| 0D | Subnet Mask | 4 BYTE | | Network subnet mask |
| 13 | Gateway | 4 BYTE | | Default gateway address |
| 19 | System name | STRING | | System name |
| | Login Name | STRING | | Name of last user logged in to system |

3 CONFIGURATION INFORMATION AREA

Blocks 4 and 5 of the EAI area constitute the Configuration Information Area, which includes an area header followed by the configuration data. The data stored in this area will be maintained by the system BIOS at each boot time. The data structures follow the 16 byte header located at the start of the CIA as represented in Table. An example of a configuration area map is given in Section 6 on page 27.

TABLE XIV

Configuration Information Area

| Offset (hex) | Description |
|---|---|
| 00 | Configuration Information Area header |
| 10 | Start configuration data |

3.1 Header

The structure for the Configuration Information Area (CIA) header, shown in Table, is similar to the headers of the other areas. The offset in the table is the offset from the start of the area. The Length field includes the total number of bytes currently used in the configuration area and can be used to locate the first free byte in the area. The maxStruct field indicates the total number of data structures in the table.

TABLE XV

Configuration Information Area Header

| Byte Offset (Hex) | Contents | Description |
|---|---|---|
| 00–03 | CON# | Plug and Play Field Identifier = CON# for configuration area |
| 04 | Length | Number of bytes used in configuration area including header |
| 05 | Reserved | Reserved for future use. Must read 0. |
| 06 | versionID | Asset Information Area version identifier (Niagara = 01h) |
| 07 | Checksum | Checksum for the first 7 bytes of the header |
| 08 | AreaChecksum | Checksum for the entire configuration area used |
| 09–0F | reserved | Reserved for future use. Should be set to all 0. |

3.2 Checksums

The HdrChecksum is the checksum for the first 7 bytes of the header. The AreaChecksum is the checksum for all data locations used in the area including the reserved header bytes and all data bytes.

3.3 Configuration Information

The configuration information, which is included in the CIA, is intended to include specific system and sub-system attributes that may be needed to facilitate configuring the system or tracking the system as an asset. The information in this area will be read by the system BIOS during the system boot and compared to the current system configuration. If there are any differences, the BIOS will update the configuration area to reflect the system configuration. The data structures used in the configuration area have a variable format with one structure for each device type in the system. Device number 0 is used for all devices in the configuration area. When multiple instances of a device are located in the system, the fields in the data structure that specify the device attributes are repeated for each device instance. This format allows for expandability of the system with a minimum of overhead bytes. The order in which instances of some device types are included in the table may be significant. This is necessary to maintain a correlation between the configuration data and the serialization data. The data structures for each of the device types used in the configuration area are defined in Sections 5.3.2 through 5.3.7. The offsets given in the tables are the byte offsets from the start of the data structure.

3.3.1 Network Interface Device Data

Table shows the data structure for a network interface, which may be a card or may be located on the planar. If present, this structure must be the first structure in the configuration area, immediately following the header.

TABLE XVI

Network Interface Data Structure

| Offset (hex) | Field Name | Field Length | Value (Hex) | Description |
|---|---|---|---|---|
| 00 | Device | BYTE | 90 | Device type and number as defined in Section 3.4 |
| 01 | Size | BYTE | 18 | Size of this structure. See Section 2.3 text. |
| 02 | UUID | 16 BYTE | | Contains the UUID for the network interface controller. A value of all 0s indicates there is no NIC present or it is unknown. |

3.3.2 CPU Data

Table XVII shows the data structure for the CPU device with SDD, which includes the CPU family name and the speed for each CPU in the system. The Family and Speed fields are repeated for each CPU in the system.

TABLE XVII

CPU Data Structure

| Offset (hex) | Field Name | Field Length | Value (Hex) | Description |
|---|---|---|---|---|
| 00 | Device | BYTE | 80 | Device type and number as defined in Section 3.4 |
| 01 | Size | BYTE | 05+ | Size of this structure. See Section 2.3 text. |
| 02 | Family | BYTE | | Defines the processor family as follows: 00 No CPU 01 Other |

TABLE XVII-continued

CPU Data Structure

| Offset (hex) | Field Name | Field Length | Value (Hex) | Description |
|---|---|---|---|---|
| | | | | 02 Unknown |
| | | | | 0B Pentium ® Family |
| | | | | 0C Pentium ® Pro Family |
| | | | | 0D Pentium ® II Family |
| | | | | 19 K5 Family |
| | | | | All other numbers are as defined by SM BIOS spec |
| 03 | Speed | WORD | | Represents the speed in MHz for which the processor has been set. |
| Repeat Family field and Speed field for additional CPUs in system. | | | | |

3.3.3 Memory Data

Table shows the data structure for the system memory field. Unpopulated DIMM sockets in the system should be indicated by including them in the table with a memory size of 0. The order of the DIMM information in the table should correspond to the DIMM socket numbers on the motherboard.

TABLE XVIII

Memory Data Structure

| Offset (hex) | Field Name | Field Length | Value (Hex) | Description |
|---|---|---|---|---|
| 00 | Device | BYTE | 88 | Device type and number as defined in Section 3.4 |
| 01 | Size | BYTE | 04+ | Size of this structure. See Section 2.3 text. |
| 02 | DIMM size | WORD | | Indicates the size in MB of the DIMM with the following special values: 0000: DIMM is not present (socket unpopulated) FFFF: Memory size is unknown |
| Repeat the DIMM size field for each DIMM socket in the system. | | | | |

3.3.4 FDD Data

Table shows the data structure for the floppy disk drives. Four bits are used to indicate the type of FDD. The type indicated reflects the value entered by the user into the diskette drive fields in system setup. Provisions are made for up to 2 drives.

TABLE XIX

FDD Data Structure

| Offset (hex) | Field Name | Field Length | Value (Hex) | Description |
|---|---|---|---|---|
| 00 | Device | BYTE | 30 | Device type and number as defined in Section 3.4 |
| 01 | Size | BYTE | 03 | Size of this structure. See Section 2.3 text. |
| 02 | Type | BYTE | | FDD 1    FDD 2<br>7 6 5 4   3 2 1 0<br>The three bits indicate the type of FDD present in the system as follows:<br>0000: FDD not present or type unknown<br>0001: 360 KB, 5.25"<br>0010: 1.2 MB, 5.25"<br>0011: 720 KB, 3.5"<br>0100: 1.44 MB, 3.5"<br>0101: 2.88 MB, 3.5" |

TABLE XIX-continued

FDD Data Structure

| Offset (hex) | Field Name | Field Length | Value (Hex) | Description |
|---|---|---|---|---|
| | | | | All others reserved for future use. |

3.3.5 IDE (HDD) Device Data

Table shows the data structure for IDE drives in the system. The Capacity and Type fields are repeated for each device in the system. The device data for each drive present should be entered into the table in the following order: primary master (0), primary slave (1), secondary master (2), secondary slave (3). Data for all positions up to and including the last position used must be entered in the table. Any unused position must be entered with a type of FF. For example, a system with two master HDDs would have type FF in the second entry of the table.

TABLE XX

IDE (HDD) Device Data Structure

| Offset (hex) | Field Name | Field Length | Value (Hex) | Description |
|---|---|---|---|---|
| 00 | Device | BYTE | 78 | Device type and number as defined in Section 3.4 |
| 01 | Size | BYTE | 06+ | Size of this structure. See Section 2.3 text. |
| 02 | Type | BYTE | | Identifies the type of device as follows:<br>05: CDROM<br>80: HDD<br>A0: Device unknown<br>FF: No device present<br>All other values reserved |
| 04 | Capacity | 3 BYTE | | If applicable, indicates the capacity of the device, truncated to the nearest MB. Unknown capacity is indicated by 0. |
| Repeat the Type and Capacity fields for each additional drive-see text. | | | | |

3.3.6 PCI Device Data

Table shows the data structure for PCI devices in the system, whether located on the motherboard or in an expansion slot. The Location byte in the structure indicates the location of each device installed with each bit corresponding to one device. The first bit (bit 0) corresponds to the first device listed in the table, the second bit corresponds to the second device, and so forth. To conserve space, this structure will only include the following PCI devices: video, audio, network interface controller, SCSI controller, and card adapters installed in a PCI slot.

TABLE XXI

PCI Device Data Structure

| Offset (hex) | Field Name | Field Length | Value (Hex) | Description |
|---|---|---|---|---|
| 00 | Device | BYTE | 60 | Device type and number as defined in Section 3.4 |
| 01 | Size | BYTE | 0A+ | Size of this structure. See Section 2.3 text. |
| 02 | Location | WORD | | Used to indicate the location of the device as follows:<br>0: PCI motherboard device<br>1: PCI adapter card<br>One bit corresponds to each device |

TABLE XXI-continued

PCI Device Data Structure

| Offset (hex) | Field Name | Field Length | Value (Hex) | Description |
|---|---|---|---|---|
| | | | | included in the table. See text above. |
| 04 | VID | WORD | | The Vendor ID of the device as defined by the PCI Specification |
| 06 | DID | WORD | | The Device ID of the device as defined by the PCI |
| 08 | SubClass | BYTE | | The sub-class of the device as defined by the PCI Specification. |
| 09 | Class | BYTE | | The class of the device as defined by the PCI Specification. |

Repeat the VID, DID, SubClass, and Class fields for each additional device in the system.

3.3.7 ISA PnP Device Data

Table shows the data structure for all ISA Plug and Play devices in the system whether located on the motherboard or in an expansion slot.

TABLE XXII

ISA PnP Device Data Structure

| Offset (hex) | Field Name | Field Length | Value (Hex) | Description |
|---|---|---|---|---|
| 00 | Device | BYTE | 68 | Device type and number as defined in Section 3.4 |
| 01 | Size | BYTE | 07+ | Size of this structure. See Section 2.3 text. |
| 03 | VID | WORD | | The Vendor ID of the device as defined by the PnP Specification |
| 05 | DID | WORD | | The Device ID of the device as defined by the ISA PnP Specification |

Repeat the VID and DID fields for each additional device located in the system.

3.3.8 SCSI Device Data

SCSI devices are not supported in the configuration area at this time.

4 EXAMPLE STRUCTURES

This section shows an example mapping of the three areas in the PCID EEPROM. It is assumed that all unused addresses in the EEPROM are written as 00h. As an example of the use of the configuration area, assume that the system, an IBM model 9999, is a 166 MHz Pentium with 2, 32 MB SIMMS, an external 256K cache, 1.2 GB hard disk, 12× speed CDROM, and a floppy disk drive. Assume further that the motherboard includes an audio subsystem and Ethernet connection and that a 33.6 kbps modem is installed in one of the ISA slots and a SCSI controller is installed in one of the PCI slots. For this system, the configuration information would look something like the following:

```
db   'CON#'              ;PnP identifier for configuration area
db   75h                 ;Total bytes used in area = 75hh
db   00h                 ;
db   01h                 ;version number
db   87h                 ;Header checksum
db   E3h                 ;Area checksum
db   00000000000000h     ;reserved bytes in header
db   90h                 ;Network interface data
db   22h                 ;Structure is 34 bytes
```

-continued

```
db   0000000000h         ;UUID for motherboard
db   0000000000h         ; network controller
db   51CC58120C0Ah       ;Ethernet MAC address = 0A0C1258CC51
db   0000000000h         ;No other NIC present
db   0000000000h         ;
db   000000000000h       ;
db   80h                 ; CPU data
db   05h                 ;Data structure is 5 bytes
db   0Bh                 ;Only one Pentium CPU with a
db   A600h               ;Speed (MHz) = 166d = A6h
db   88h                 ;memory data
db   08h                 ;Structure is 6 bytes
db   2000h               ;2 DIMMS each with
db   2000h               ;capacity of 32 MB (20h)
db   0000h               ;Third DIMM socket unpopulated
db   50h                 ;Cache data
db   04h                 ;Structure is 4 bytes
db   0400h               ;a 256 KB (4 × 64K) cache
db   30h                 ;Floppy data
db   03h                 ;Structure is 3 bytes
db   30h                 ;One 3.5", 1.44 MB
db   78h                 ;IDE devices
db   0Ah                 ;Structure is 10 bytes
db   80h                 ;Primary master is a HDD
db   B00400h             ;HDD size (MB) = 1200d = 4B0h
db   FF000000h           ;No primary slave present
db   05                  ;Secondary master is a CDROM
db   000000h             ;Capacity unknown
db   60h                 ;PCI data
db   16h                 ;Structure is 22 bytes
db   0400h               ;First two devices are motherboard, third device is card
db   000000000003h       ;PCI device, class = 03, sub-class = 00
db   000000000002h       ;PCI device, class = 02, sub-class = 00
db   000000000001h       ;PCI card, class = 01, sub-class = 00
db   68h                 ;ISA data
db   0Fh                 ;Structure is 15 bytes
db   02h                 ;first device is motherboard, second is card
db   0E633642h           ;ISA device vendor id bytes
db   0E630000h           ;ISA card
```

As an example of a User Information Area, assume the same system as in the previous example is being leased for one year for $100.00 per month and will be assigned to John Doe in the Engineering department. Also assume that User Device is to represent the address of the person assigned the system. The corresponding data structure might look as follows:

```
db   'USR#'              ;PnP identifier for the User Information area
db   C3h                 ;Total bytes used in area = 159d
db   00h                 ;
db   01h                 ;version id = 01 for Niagara
db   1Fh                 ;Header checksum
db   66h                 ;Area checksum
db   00000000000000h     ;Reserved bytes
db   FFh                 ;System Owner device
db   1Dh                 ;Data structure is 29d bytes
db   'John Doe'          ;User name
db   00h                 ;null terminator
db   'Engineering'       ;User department
db   00h                 ;null terminator
db   'B/201'             ;located in building 201
db   00h                 ;null terminator
db   00h                 ;no phone
db   Feh                 ;Lease data device
db   13h                 ;Data structure is 19d bytes
db   05201997h           ;Lease starts May 20, 1997
db   04301998h           ;Lease ends Apr. 30, 1998
db   01h                 ;Lease term is monthly
db   '$100.00'           ;Lease for $100
db   00h                 ;null terminator
db   FDh                 ;Asset data device
```

| | | |
|---|---|---|
| db | 1Ch | ;Data structure is 28d bytes |
| db | 00000000h | ;No purchase date |
| db | 00000000h | ;No inventory date |
| db | 04301998 | ;warranty expires Apr. 30, 1998 |
| db | 0Ch | ;12 month warranty |
| db | '$30' | ;warranty cost is $30/month |
| db | 00h | ;null terminator |
| db | '12345678' | ;Asset number = 12345678 |
| db | 00h | ;null terminator |
| db | FCh | ;Image profile device |
| db | 12h | ;Data structure is 18 bytes |
| db | 05201997 | ;image loaded May 20, 1997 |
| db | 'Engineering' | ;Assigned image for Engineering |
| db | 00h | ;null terminator |
| db | FBh | ;User defined device |
| db | 46h | ;Size of structure = 70 bytes |
| db | 'Address' | ;First entry is the address |
| db | 00h | ;null terminator |
| db | '3039 Cornwallis Rd' | ;Address |
| db | 00h | ;null terminator |
| db | 'City' | ;Second entry is the city |
| db | 00h | ;null terminator |
| db | 'RTP' | ;Name of the city |
| db | 00h | ;null terminator |
| db | 'State' | ;Third entry is the state |
| db | 00h | ;null terminator |
| db | 'NC' | ;Name of the state |
| db | 00h | ;null terminator |
| db | 'Zipcode' | ;Fourth entry is the zipcode |
| db | 00h | ;null terminator |
| db | '27709' | ;zipcode |
| db | 00h | ;null terminator |
| db | FAh | ;Network connection data |
| db | 17h | ;Structure is 23 bytes |
| db | 09257564h | ;IP address = 9.37.117.100 |
| db | FFFFF000h | ;Subnet mask = 255.255.240.0 |
| db | 09256475h | ;IP address = 9.37.100.117 |
| db | 'John Doe' | ;Last user was John Doe |
| db | 00h | ;null terminator |

As an example of the use of the serialization area, the data for the system described in the previous examples might look like the following:

| | | |
|---|---|---|
| db | 'SER#' | ;PnP identifier for serialization area |
| db | 14h | ;Number of bytes in entity field = 20d = 14h |
| db | 04h | ;There are serial numbers for 4 entities following header |
| db | 02h | ;version number |
| db | D9h | ;Header checksum |
| db | 0Ah | ;Area checksum |
| db | 00000000000000h | ;reserved bytes |
| db | 80h | ; CPU device |
| db | 'P7H1001' | ;p/n = 07H1001 |
| db | 000000000000h | ;nulls |
| db | 000000000000h | ;nulls |
| db | 88h | ;memory device, instance 1 |
| db | 'P64H1000' | ;p/n = 64H1000 |
| db | 000000000000h | ;nulls |
| db | 0000000000h | ;nulls |
| db | 89h | ;memory device, instance 2 |
| db | 'P64H1000' | ;p/n = 64H1000 |
| db | 000000000000h | ;nulls |
| db | 0000000000h | ;nulls |
| db | 1Ah | ;CDROM-secondary master, instance number = 2 |
| db | 'P78G1234' | ;s/n = 78G1234 |
| db | 000000000000h | ;nulls |
| db | 0000000000h | ;nulls |
| db | 78h | ;HDD-primary master, instance number = 0 |
| db | 'P78G1234' | ;s/n = 78G1234 |
| db | 000000000000h | ;nulls |
| db | 0000000000h | ;nulls |
| db | 40h | ;Motherboard device |
| db | 80h | ;1st character indicates an 11S prefix |
| db | '1K2121YJ10XX7850-11' | ;p/n = 11S01K2121YJ10XX785011 |

Having described the invention in terms of a preferred embodiment thereof, it will be recognized by those skilled in the art of computer equipment design that various additional changes in the structure and operation of the implementation described can be made without departing from the spirit and scope of the invention which is measured by the following claims.

We claim:

1. A method of deploying a workstation computer comprising the steps of:

connecting a dual port RF identification tag to a memory bus of the computer to provide for electrical communication between the RF identification tag and the computer;

storing user information in the dual port RF identification tag using an RF port without unpacking and applying power to the computer;

forwarding the computer to the end user workstation location; and downloading software and user data to the computer after installing the computer hardware at the end user workstation location to tailor the workstation.

2. A method of controlling a workstation asset comprising the steps of:

connecting a dual port RF identification tag to a memory bus of the computer to provide for electrical communication between the RF identification tag and the computer;

storing serial number and user information in the dual port RF identification tag in the workstation using an RF port of the tag without unpacking and applying power to the computer; and reading an EEPROM memory in the RF identification tag to obtain serial number and user information using the RF port.

* * * * *